(12) United States Patent
Macz

(10) Patent No.: US 10,101,460 B2
(45) Date of Patent: Oct. 16, 2018

(54) PET LOCATING DEVICE

(71) Applicant: Kevin Macz, Fairbanks, AK (US)

(72) Inventor: Kevin Macz, Fairbanks, AK (US)

(*) Notice: Subject to any disclaimer, the term of this patent is extended or adjusted under 35 U.S.C. 154(b) by 163 days.

(21) Appl. No.: 15/094,115

(22) Filed: Apr. 8, 2016

(65) Prior Publication Data

US 2017/0293033 A1    Oct. 12, 2017

(51) Int. Cl.
  *G01S 19/16*  (2010.01)
  *G01S 19/34*  (2010.01)
  *G01S 19/42*  (2010.01)

(52) U.S. Cl.
  CPC .......... *G01S 19/16* (2013.01); *G01S 19/42* (2013.01)

(58) Field of Classification Search
  CPC ................................. G01S 19/16; G01S 19/34
  USPC ............ 342/357.21, 357.54, 357.65, 357.74; 701/490, 519
  See application file for complete search history.

(56) References Cited

U.S. PATENT DOCUMENTS

2013/0063282 A1* 3/2013 Baldwin ............... B61L 29/282
                                                        340/941
2013/0150028 A1* 6/2013 Akins ..................... H04W 4/02
                                                        455/427

* cited by examiner

*Primary Examiner* — Dao L Phan
(74) *Attorney, Agent, or Firm* — Jerry D Haynes; Law Office of Jerry D Haynes P.A

(57) ABSTRACT

A pet-locating device adapted for embedding under the skin of an animal that includes: a micro global positioning transmitter; a rechargeable battery, where the rechargeable battery supplies power to the global positioning transmitter; a voltage regulator, where the voltage regulator controls the power supply to the global positioning transmitter; and a power generator, where the power generator charges the rechargeable battery. The power generator uses mechanical motion as the mechanism to generate power.

2 Claims, 1 Drawing Sheet

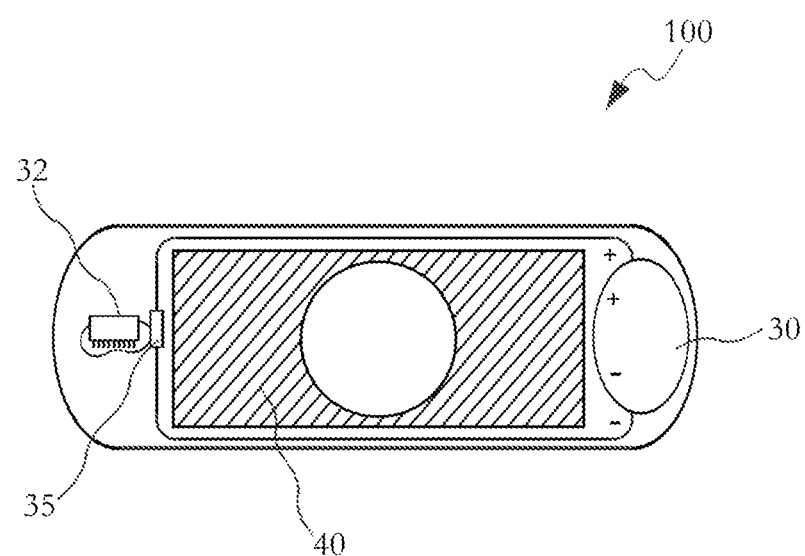

PET LOCATING DEVICE

BACKGROUND OF THE INVENTION

Field of Invention

The present invention relates to a pet-locating device adapted for embedment under the skin of the animal.

Description of Related Art

Many pets wander away from owners or at certain times may be stolen. Many individuals enjoy pets and as a result it is important for pet owners to keep aware of their pets' location. Nonetheless a pet may break loose of a leash or may escape from a yard enclosure. When this happens it is difficult for many pet owners to locate their pet and sometimes the pet's safety can be in danger. As a result, it is advantageous to have a device that could be implemented to easily track and locate a lost or stolen pet.

SUMMARY OF THE INVENTION

The present invention relates a pet-locating device adapted for embedding under the skin of an animal that includes: a micro global positioning transmitter; a rechargeable battery, where the rechargeable battery supplies power to the global positioning transmitter; a voltage regulator, where the voltage regulator controls the power supply to the global positioning transmitter; and a power generator, where the power generator charges the rechargeable battery. The power generator uses mechanical motion as the mechanism to generate power.

BRIEF DESCRIPTION OF DRAWINGS

FIG. 1 depicts a prospective view of a pet-locating device according to the present invention.

DETAILED DESCRIPTION

The present invention relates to a pet-locating device that incorporates a microchip that includes global positioning capabilities, i.e. GPS, further included with the pet-locating device according to present invention, which is incorporated into a small chip with a pill-like casing. Preferably the pill-like casing is embedded under the skin of the pet so that the chip remains in place with the pet. Presently devices are available where GPS devices are installed on collars however a collar may be easily removed or the pet may escape from the collar. The present invention is inserted under the skin of the pet near the legs, tail or head to avoid causing discomfort for the pet. Once activated the microchip transmits a signal to continuously track and locate a pet user. The microchip is powered by the use of a small battery, which uses a mechanical generator for supplying power to the battery. Further a voltage regulator is provided in the form of a transistor that regulates voltage supplied to the GPS component.

In reference to FIG. 1, a pet-locating device 100 in accordance with the present invention is depicted. The pet-locating device includes a micro global positioning transmitter 32. This global positioning transmitter 32 enables the user to locate their pet at any time via the GPS locating system. A rechargeable battery 30 is also provided that provides power to the global positioning transmitter 32. Further connected to the global positioning transmitter 32 is a voltage regulator 35. This voltage regulator 35 is in the form of a transistor that regulates power to the GPS chip 32. The battery 30 is a rechargeable battery that is charged through a mechanical charging apparatus in the form of power generator 40. The power generator 40 uses a shake mechanism in order to continuously charge and supply power to the battery 30. As a result, the present invention utilizes shake power with the power generator 40 that powers and charges the rechargeable built-in battery 30. Preferably the locating device is manufactured out of sterile plastic and coil copper materials for durability. The instant invention has been shown and described in what it considers to be the most practical and preferred embodiments. It is recognized, however, that departures may be made there from within the scope of the invention and that obvious modifications will occur to a person skilled in the art.

What is claimed is:

1. A pet-locating device adapted for embedding under the skin of an animal comprising:
   a. a micro global positioning transmitter;
   b. a rechargeable battery, where the rechargeable battery supplies power to the global positioning transmitter;
   c. a voltage regulator, where the voltage regulator controls the power supply to the global positioning transmitter;
   d. a power generator, where the power generator charges the rechargeable battery; and
   e. a pill-like casing, where the pill-like casing encloses the micro global positioning transmitter and is adapted to embed under the skin of the animal.

2. The pet-locating device according to claim 1, where the power generator uses mechanical motion as the mechanism to generate power.

* * * * *